Aug. 28, 1956

A. P. KRUEGER 2,760,572

RESILIENT PRESSER MEMBER CARRIED BY A SEVERING
MEMBER FOR URGING A STRIPPED PORTION OF
TAPE AGAINST A STRIPPING ELEMENT

Filed Dec. 8, 1951

INVENTOR
Alfred P. Krueger
BY
Rockwell & Bartholow
ATTORNEYS

Aug. 28, 1956  A. P. KRUEGER  2,760,572
RESILIENT PRESSER MEMBER CARRIED BY A SEVERING
MEMBER FOR URGING A STRIPPED PORTION OF
TAPE AGAINST A STRIPPING ELEMENT
Filed Dec. 8, 1951  4 Sheets-Sheet 2

INVENTOR
Alfred P. Krueger
BY
Rockwell & Bartholow
ATTORNEYS

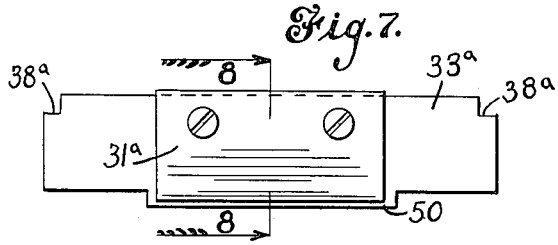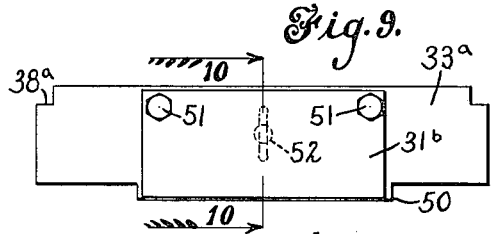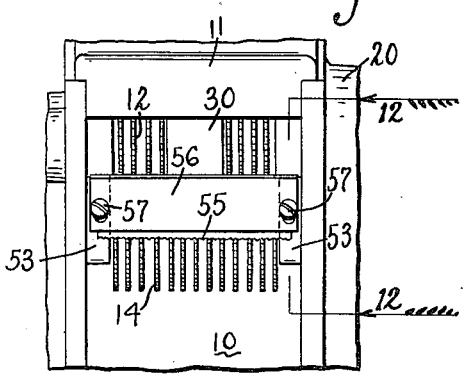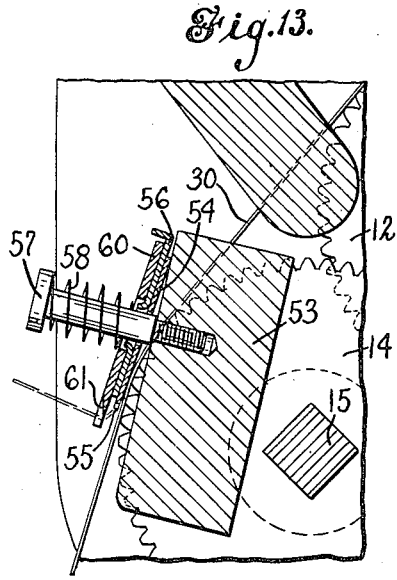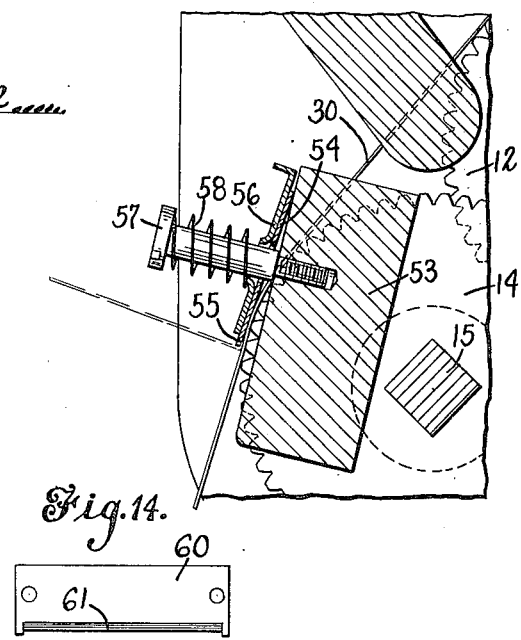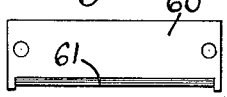

Aug. 28, 1956

A. P. KRUEGER 2,760,572

RESILIENT PRESSER MEMBER CARRIED BY A SEVERING,
MEMBER FOR URGING A STRIPPED PORTION OF
TAPE AGAINST A STRIPPING ELEMENT

Filed Dec. 8, 1951

INVENTOR
Alfred P. Krueger
BY
Rockwell & Bachtolour
ATTORNEYS

United States Patent Office 2,760,572
Patented Aug. 28, 1956

2,760,572

RESILIENT PRESSER MEMBER CARRIED BY A SEVERING MEMBER FOR URGING A STRIPPED PORTION OF TAPE AGAINST A STRIPPING ELEMENT

Alfred P. Krueger, Stratford, Conn., assignor to Derby Sealers, Incorporated, Derby, Conn., a corporation of Connecticut Application December 8, 1951, Serial No. 260,711

The portion of the term of the patent subsequent to June 7, 1972, has been disclaimed 4 Claims. (Cl. 164—84.5)

This invention relates to dispensers for pressure-sensitive tape and more particularly to a device for dispensing a tape from a supply roll by the operation of a crank or lever as distinguished from the type of dispenser in which the leading end of the tape is grasped by the hand and drawn from the dispenser by a direct pull exerted by the user.

As illustrated, a lever or crank is provided to effect rotation of a feed member such as a roller or drum to which the tacky side of the tape is attached to adhere and a severing member is provided so that when a length of tape has been dispensed it may be grasped by the fingers and drawn against the severing member to be cut from the tape connecting with the supply roll. It is desirable in devices of this character to provide some means of stripping the tape from the feed roll or drum in order that it does not adhere closely to this member and follow it around during its rotation. If a stripping member is not provided and the free end of the tape clings to the feed drum, it cannot readily be grasped by the fingers in order to be severed.

It has been found that pressure-sensitive tapes are variously affected by atmospheric conditions depending upon the particular type of tape that is being dispensed. There are many different kinds of pressure-sensitive tape manufactured at the present time, and the tendency of the free end of the tape to curl varies greatly, the free end usually tending to curl toward the non-tacky side of the tape.

This is particularly true of the crepe paper tapes and the heavy paper-back tapes used for masking purposes and also in other relations. There are, of course, other tapes which tend to curl inwardly or toward the non-tacky side of the tape, and dispensing mechanisms must be made to fit all of these conditions.

In connection with some kinds of pressure-sensitive tapes, for example, the heavy paper tapes which have greater resistance to unwinding, the tendency of the tape to curl or roll up outwardly upon itself is so strong that the free end of the tape will curl back and adhere to a following portion of the tape length so that the ordinary tape-dispensing machine cannot be used. The present invention is particularly adapted to meet such a condition, and means are provided which serve to prevent the curling of the free end of the tape after it leaves the feed roll and stripper. This is accomplished by pressing the tape against the elements of the stripper roll so that the portion of the tape between the stripper roll and the feed roll will be substantially tangent to these rolls. The maintenance of a straight path between the rolls for this portion of the tape serves, as has been shown, to prevent the free end of the tape from curling rearwardly upon itself.

In the present machine the stripper is a rotatable element comprising a plurality of disk-like members which overlap or operate between corresponding members provided on the feed roll so that a "bite" is formed between the elements of the feed roll and the stripper similar to that which exists between two meshing gears. Ordinarily when the tape is fed over the feed roll, it will follow the latter until it is contacted by the stripper elements, and thus the tape will follow the surfaces of the feed elements and stripper elements closely so as to be directed close to the bite between these elements. I have discovered that if means are provided to prevent the tape being directed toward the bite of the feed and stripper elements and instead to cause the portion of the tape between the surfaces of these elements to follow a course substantially tangent thereto, the free end of the tape will have little or no tendency to curl but will be directed from the machine in a substantially straight length.

One object of the present invention is to provide a new and improved means for dispensing pressure-sensitive tape.

Another object of the invention is to provide means for preventing the free dispensed end of the tape from curling or tending to roll up upon itself.

Still another object of the invention is to provide a tape-dispensing machine comprising a feed drum and a stripper member, the drum and member having overlapping disk-like elements with means to press the tape against the peripheries of the stripper elements in order to prevent the tape from being directed into the bite between the feed drum and stripper.

A still further object of the invention is to provide a tape-dispensing machine of the character described with a severing member or blade mounted closely adjacent the stripper member and providing means on the severing blade to strip the tape from the blade after the severing operation and also press the tape against the stripper member during the feeding operation so as to prevent the tendency of the free end of the dispensed tape to curl or roll upon itself.

A still further object of the invention is to provide a new and improved severing blade for a tape-dispensing machine of the character described, and new and improved means for mounting this blade.

To these and other ends the invention consists in the novel features and combinations of parts to be hereinafter described and claimed.

In the accompanying drawings:

Fig. 7 is an elevational view of a modified form of cutter or severing blade;

Fig. 8 is a sectional view on line 8—8 of Fig. 7;

Fig. 9 is a view similar to Fig. 7 showing a further modification of the severing blade;

Fig. 10 is a sectional view on line 10—10 of Fig. 9;

Fig. 11 is a detail front elevational view of a tape-dispensing machine showing a further modified form of severing mechanism;

Fig. 12 is a partial sectional view on line 12—12 of Fig. 11;

Fig. 13 is a view similar to Fig. 12 showing a still further modified form of severing mechanism;

Fig. 14 is an elevational view of the severing knife employed in the mechanism illustrated in Fig. 13;

Figure 1:
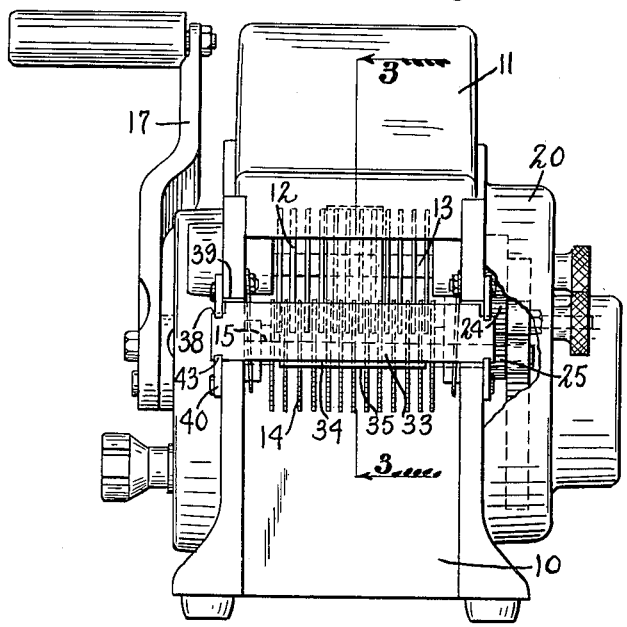
Fig. 1 is a front elevational view of a tape-dispensing machine embodying my invention.

To illustrate a prefered embodiment of my invention I have shown in the drawings a tape-dispensing mechanism comprising a casing 10 having a removable cover 11 which in this instance rests freely upon the upper edges of the casing walls. Within the casing is a rotatably mounted feed roll or drum which in this instance comprises a number of disk-like members 12 mounted upon a square shaft 13 so that they will rotate with the shaft. While the members 12 may be separate disks if desired, the same effect might be provided in other ways such as by providing a plurality of relatively deep annular grooves in a cylindrical drum so that the stripper elements could extend into these grooves as shown.

Figure 3:
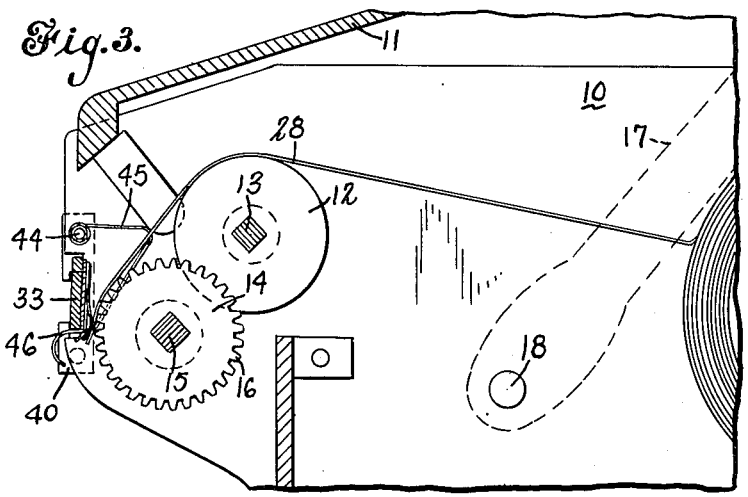
Fig. 3 is a partial sectional view on line 3—3 of Fig. 1.
Figure 4:
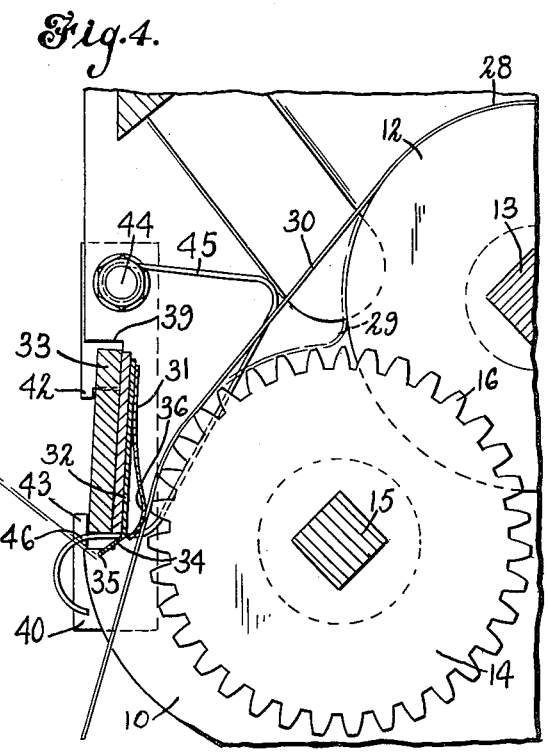
Fig. 4 is an enlarged view similar to Fig. 3 showing the operation of the device.

Also rotatably mounted within the casing and adjacent the forward upper end thereof is a stripper member which in this instance comprises a plurality of disks 14 mounted loosely upon a non-circular shaft 15 so that the disks will rotate with the shaft. As seen in Figs. 3 and 4, the disks 14 extend between the disk-like members 12 so that the tape which is fed over the members 12 will be stripped therefrom by stripping members 14. The latter are preferably provided with teeth 16 on the peripheries so as to lessen the area of engagement of their surfaces with the tape.

A handle or lever 17 is secured to a shaft 18 rotatably mounted in the casing. The end of this shaft opposite that upon which the handle is secured extends into a gear casing 20 disposed at one side of the casing 10.

Figure 2:
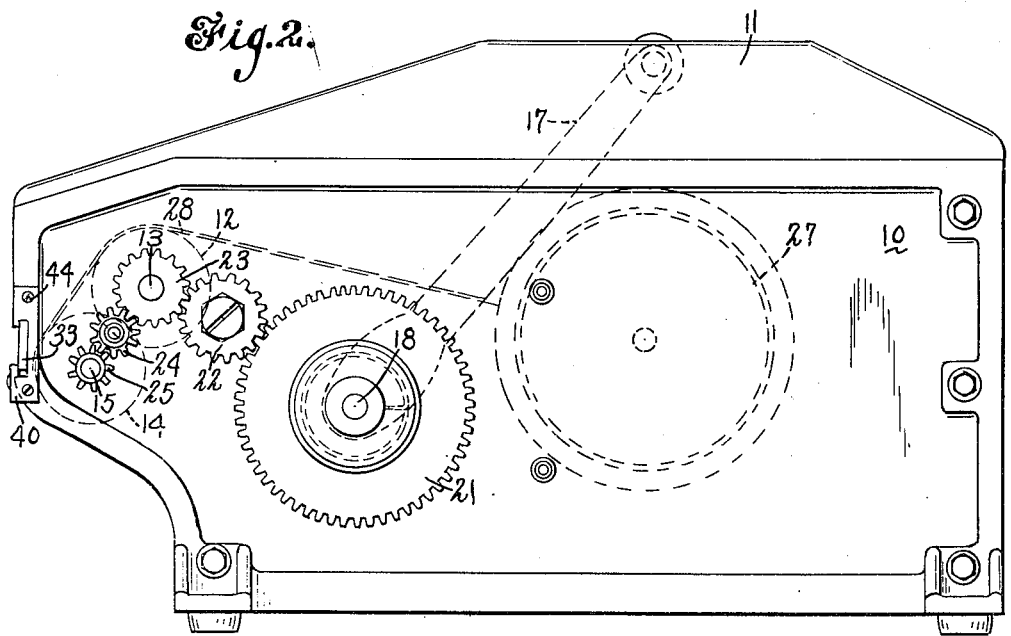
Fig. 2 is a side elevational view thereof.

Any suitable means may be employed for driving the feed drum and stripper member from the shaft 18 and such, for example, as that shown in my co-pending application Serial No. 190,705, filed October 18, 1950. As shown, a gear 21 is provided, which gear has a one-way connection with the shaft 18, which gear in turn drives a pinion 22, the teeth of which mesh with those of a gear 23 upon the shaft 13 of the feed element. The gear 23 in turn meshes with a pinion 24, which in turn meshes with a pinion 25 upon the shaft 15 of the stripper element. It will be seen, therefore, that when the crank or handle 17 is moved in a forward direction or to the left, as shown in Fig. 2, both the feed drum and the stripper elements will be rotated. The relation of the gears 23, 24 and 25 is such that the stripper elements will have a greater surface speed than those of the feed elements so that the tape will not cling to the stripper elements but will be stripped therefrom owing to the fact that the teeth 16 which engage the tape will be traveling at a greater speed than the adjacent surface of the tape.

As shown in Fig. 2 and Fig. 3, a roll of tape 27 may be mounted in the machine and the end of the tape from this roll is trained over the elements 12 of the feed member, as shown at 28. Ordinarily the tape would follow the elements 12 of the feed drum around approximately to the point where it would be stripped therefrom by the stripper elements 14, as shown by the dotted line 29 in Fig. 4. It has been discovered, however, that if means are provided for pressing a leading portion of the tape against the stripping elements, the tape will assume a path substantially tangent to the disks 12 and 14, as shown in full lines at 30 in Figs. 3 and 4. It has also been found that this will take the curl out of the tape so to speak, which would otherwise tend to curl or roll upon itself and cause the free end of the tape to issue from the machine in a substantially straight path.

Figure 6:
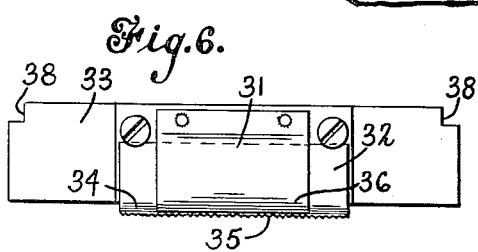
Fig. 6 is a rear elevational view of the severing blade and associated parts.

To effect this function of pressing the tape against the surfaces of the stripper elements 14, I have provided a flat spring-like member 31, shown more especially in Figs. 4 and 6, and, as will be later explained, this spring-like member is secured to the severing member so that it will be carried on the rear surface thereof in such position that its lower free edge will be urged by its inherent resiliency against or toward the surfaces of the stripper elements 14.

A severing knife 32 is mounted upon the rear face of a knife support 33, this knife projecting from the lower end of the support and being inclined slightly forwardly, as shown at 34. The free edge of the knife may be slightly serrated, as at 35, to provide an efficient tearing or severing edge. As will be apparent from Figs. 4 and 6, the member 31 is secured as by brazing or the like along its upper rear edge to the severing member 32, the lower edge of the member 31 being left free and being curved rearwardly as shown at 36. The member 31 is resilient and will be urged by its own resiliency toward the stripper members 14. It may also here be noted that the free end of the tape will issue between the presser member 31 and the stripper elements 14, and that when the tape is drawn over the severing edge 35 of the severing member 32, the presser member 31 will be drawn forward slightly toward the knife. After the severing operation the presser member will also act as a stripper member to strip the unsevered end of the tape from the knife and place it against the stripper members 14.

The knife support is removably mounted so that this support together with the knife 32 and presser member 31 may be removed from the casing when desired. As shown in Fig. 6, the knife support is a member of substantially rectangular shape having its upper corners cut away, as shown at 38, so that the ends of the support are slightly reduced. The walls of the casing are provided with cutout portions or recesses 39 within which the knife support 33 is received, and upon the walls of the casing adjacent these recesses are secured plates 40 having recesses 41 provided therein to register with the recesses 39.

Figure 5:
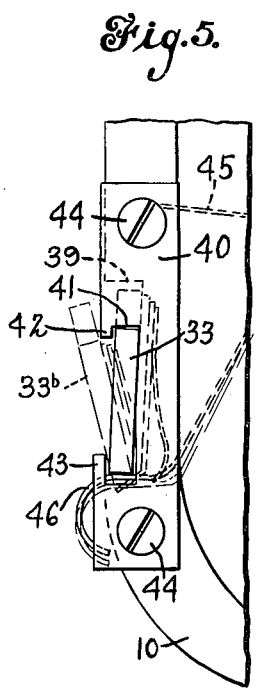
Fig. 5 is a fragmentary side elevational view of the forward part of the machine showing the means for mounting the detachable knife or severing blade.

Lugs 42 and 43 provided on the plates 40 project downwardly from the upper edge of the recesses 41 and upwardly from the lower edge thereof, as shown in Fig. 5, so as to provide a reduced entrance opening into the recesses 41, this opening being sufficiently long to receive the reduced ends of the cutter support 33 formed by the notches 38. It will be noted that the lower lug 43 is somewhat longer than the upper lug 42.

Upon each of the casing walls is secured by the screws 44 which hold the plates in place, wire spring members 45, the lower free ends of these members being turned forwardly, as shown at 46, so as to be disposed at a level normally slightly above the lower ends of the recesses 39.

When it is desired to mount the knife support and knife in place upon the casing, the support 33 is turned at an angle, as shown in dotted lines at 33ᵇ in Fig. 5, and the lower edge of the support inserted behind the lugs 43 in the recesses 41. The lower edge of the supporting plate 33 then rests upon the portions 46 of the spring members 45. The supporting plate 33 is then pressed downwardly to a sufficient extent so that its reduced end portions opposite the notches 38 will pass by the downwardly projecting lugs 42 so as to enter the recesses 41, as shown in full lines in Fig. 5. When downward pressure upon the plate 33 is released, the portions 46 of the springs 45 will spring upwardly so as to carry the plate 33 to the position shown in full lines in Fig. 5 wherein the upper edges of the plate will be locked behind the lugs 42 while the lower edge will still be held in place by the lugs 43. The plate 33 may be removed by a reverse operation in that the plate will first be pressed downwardly until the upper edge portions will clear the lugs 42 when it may be drawn outwardly at its upper edge and thereafter drawn out at its lower edge.

From Fig. 4 of the drawings it will be apparent that the stripper member will urge the tape away from the severing element and against the periphery of the members 14 of the stripping element, thus causing the tape to follow a substantially straight path between the feed element and the stripper element, this path being substantially tangent to both elements. This, it is found, will prevent the free end of the tape from tending to curl upon itself and will obviate the inconvenience which would be caused thereby.

It may be found desirable to combine the severing knife and the knife support into one integral part, and such a construction is shown in Fig. 7. Here the support 33a for the severing member is constructed similarly to the support 33, particularly in that it is provided with the notches 38a so that it may be removably secured to the frame in the manner described in connection with the support 33. This member, however, is provided with a sharpened lower edge 50 which forms the severing member instead of providing a separately made severing member and securing it to the support.

Secured to the rear face of this severing member is a resilient spring member 31a similar to the member 31, and which functions in the same manner as the element 31 to urge the tape against the stripper elements 14 and cause that portion of the tape between the feed rolls and the stripper rolls to lie substanitally tangent to these elements, as shown at 30 in Fig. 4.

In Figs. 9 of the drawings, the knife 33a is substantially like that shown in Fig. 7 and is provided at its lower portion with the sharpened edge 50. A spring member 31b is secured at the rear portion of the cutting member by the screws 51 in such a manner that the member 31b is not clamped tightly against the member 33a but is permitted some play around the body of the screws. The position of the member 31b with respect to the support 33a is determined by the set screw 52 threaded into the member 33a so that the member 31b may be held in the desired spaced relation to its support. It will be understood that the member 31b is resilient, and by turning the screw 52 the pressure of this member upon the stripper elements 14 may be determined by adjustment of the screw 52.

In Figs. 11 and 12 of the drawings, I have shown a slightly modified form of my invention wherein the cutter member is secured at each end to lugs 53 provided upon the side walls or side frame members of the device. In this case the cutter member is shown at 54, and it is preferably provided with a serrated edge 55. The cutter is secured to the rear face of a reinforcing plate 56, and the cutter and plate are provided with registering openings to receive screws 57 threaded into the lugs 53. A coil spring 58 is compressed between the head of the screw 57 and the plate 56 so that the severing member 54 will be resiliently urged toward the stripper elements 14. Thus, in this case the stripper element may be rigid but resiliently held against the stripper roll by the action of the spring 58, and the screws 57 may be adjusted to adjust the tension of this spring.

I have found that while a serrated edge will normally function satisfactorily in connection with paper tapes, cellulose tapes or the like, such a blade is often unsatisfactory in connection with the dispensing of filament tapes or cloth tapes. The latter are severed more efficiently with a blade having a sharp edge without serrations. A serrated edge is, however, advantageous in that it will prevent the slipping of the tape sidewise which sometimes occurs when a sharp, smooth edge is employed. In Fig. 13 of the drawings, I have shown a construction wherein the advantages of both the sharpened edge and the serrated edge are combined so that the tape will be cut upon the sharp, smooth edge, and at the same time the serrated edge will prevent slipping of the tape toward one side. This slipping of the tape occurs because very often the tape is drawn to one side or the other rather than pulled against the blade in a direction directly transverse to its length.

As shown in Fig. 13 of the drawings, I have provided a serrated blade 54 and a reinforcing member 56, these members being the same as shown in Fig. 12, and the member 54 is provided with a lower serrated edge 55 as before. In front of the reinforcing plate 56, however, there is disposed a severing member 60 with a smooth sharpened lower edge 61. The members 54, 56 and 61 are all provided with registering openings to receive the screw 57, and the spring 58 compressed between the head of the screw and the severing member 60 resiliently urges the member 54 against the stripper elements 14 so as to maintain the length of tape 30 in a plane substantially tangent to the stripper and feed elements.

It will be apparent that the edge 61 of the severing blade extends downwardly below the edge 55 of the member 54 so that when the tape is drawn upwardly, as shown in dotted lines in Fig. 13, it will strike the smooth, sharp edge 61 and be severed thereby. It will, however, also come in contact with and be engaged by the serrated edge 55, which engagement will prevent the tape from slipping sideways even if the pull upon the tape would be inclined to produce such motion. When the tape is held against movement to one side or the other by the serrated edge, it will be severed neatly along a line transversely of its length by the sharpened edge 61.

It will be seen that when the tape is pressed against the stripping roll by mechanism previously described so that the length of tape between the stripping and feeding rolls will be tangent to both of these rolls, it will not always be necessary to provide an overlapping or intermeshing relationship between the feeding and stripping elements. In that event, these elements may not comprise spaced disks but may be continuous in a lengthwise or axial direction.

Figure 15:
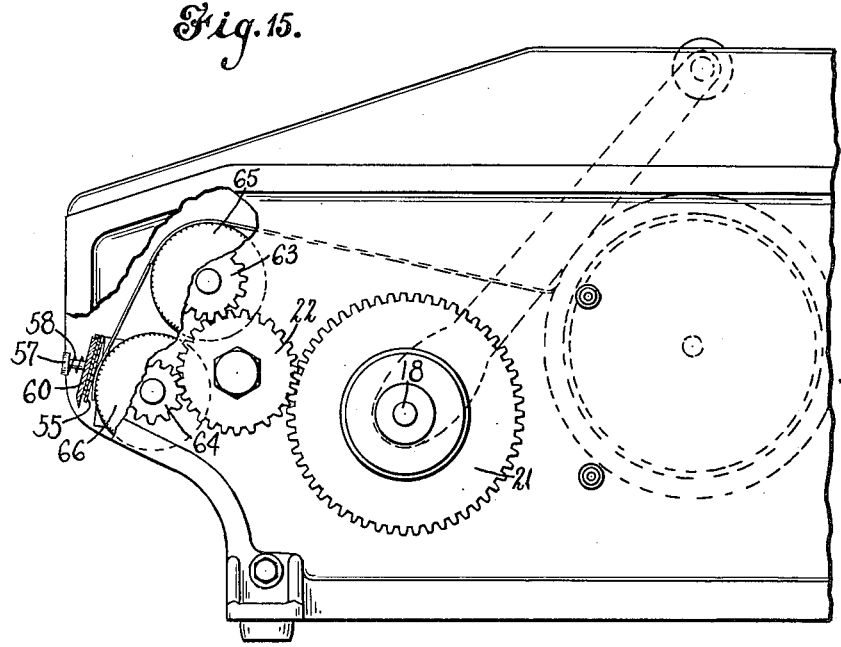
Fig. 15 is a side elevational view of the front portion of a tape-dispensing mechanism, with some parts broken away, showing a modified form of the invention.
Figure 16:
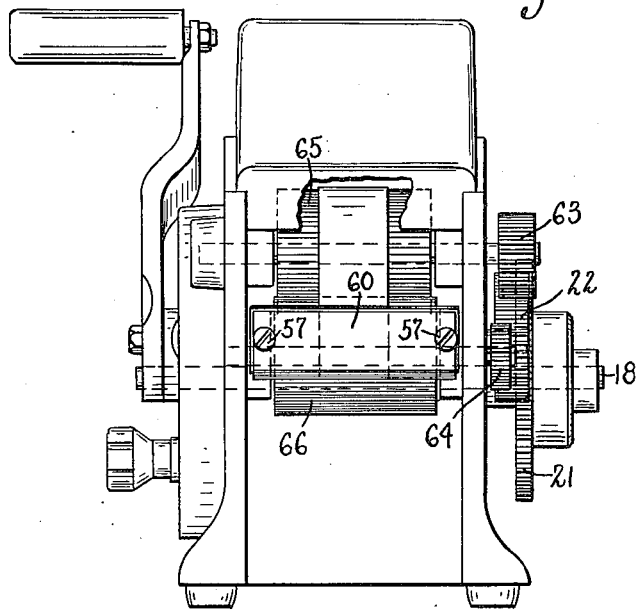
Fig. 16 is a front view of the device shown in Fig. 15.

A structure of this type is shown in Figs 15 and 16 wherein the operating shaft 18 serves to actuate a gear 21 which in turn actuates a gear 22, the teeth of this gear being in mesh with gears 63 and 64 secured to the shafts of the feed roll 65 and stripping roll 66 respectively.

Secured to the frame and adjacent the stripping roll 66 is the severing mechanism which is similar to that shown in Figs. 12 and 13 and comprises a severing member 60 urged toward the roll 66 by the spring 58 upon the screw 57.

Also, as illustrated in these figures, the severing member 55 is employed with the member 60, and the member 55 is pressed against the stripping roll to press the tape against the latter. It will be noted that in this instance the feed roll 65 and stripping roll 66 are solid rolls or continuous in a longitudinal direction, and hence do not intermesh. They are driven in the same direction by the pinions 63 and 64, and their surfaces are roughened so that there will be the proper adherence of the tape thereto. It will also be noted that the gear 63 is slightly larger than the gear 64 so that the stripping roll 66 will be rotated at a slightly greater speed than the feed roll 65 so that the tape will be stripped from the stripping roll. It will be understood, therefore, that the provision of means to press the tape against the stripping roll will be useful whether the feed and stripping rolls comprise intermeshing disks or comprise spaced rolls.

It may also be noted that as the feed roll and stripping roll may be spaced apart, according to the present invention, the user is not limited to particular types of rolls. Instead of having both rolls with longitudinally continuous surfaces, as illustrated in Figs. 15 and 16, the rolls may be provided with disk-like feeding elements and may still be spaced apart or placed in non-overlapping relation. Thus, the spacing of the disk elements on one need not necessarily bear any relation to the spacing of the disks on the other, and the number of disks on one of the rollers may be greater than that on the other.

Also, one of the rolls, such as the feed roll, for example, may be solid or have a longitudinally continuous surface, and the stripping roll may be provided with disk-like elements, if desired, or any other arrangement may be made which is found desirable for the particular type of tape to be dispensed.

While I have shown and described some preferred embodiments of my invention, it will be understood that it is not to be limited to all of the details shown, but is

What I claim is:
1. A device for dispensing pressure-sensitive tape, a frame, a rotatable feed element carried by the frame comprising a plurality of spaced disk-like tape-contacting members, a rotatable stripping member having tape-engaging members extending between said disk-like members to strip the tape therefrom, a severing member carried by the frame, and a resilient pressure member carried by the severing member on the side thereof adjacent said stripping element to engage the nontacky side of the tape to urge the stripped portion of the tape against said tape-engaging members of the stripping element and maintain the portion of the tape between the feed element and the stripping element substantially tangent to both thereof.

2. A device for dispensing pressure-sensitive tape as set forth in claim 1 wherein said resilient presser member also serves to strip the tape from the severing element.

3. A device for dispensing pressure-sensitive tape as in claim 1 wherein said severing element and said resilient presser element are detachably secured to the frame, and means are provided to adjust the pressure of said presser member against the tape.

4. A device for dispensing pressure-sensitive tape as in claim 1 wherein a plate is detachably mounted on the frame and said severing member and resilient presser member are carried by said plate, said severing member lying between said presser member and the plate, and said presser member being urged by its resiliency toward the stripping element to urge the tape against the periphery of the latter and maintain it in taut condition between the feed element and the stripping element and also strip the tape from the severing member.

References Cited in the file of this patent

UNITED STATES PATENTS

| | | |
|---|---|---|
| 1,030,014 | Rose | June 18, 1912 |
| 1,972,850 | McCarthy | Sept. 4, 1934 |
| 1,972,851 | McCarthy | Sept. 4, 1934 |
| 2,088,320 | De Vries | July 27, 1937 |
| 2,149,869 | Ringel | Mar. 7, 1939 |
| 2,164,634 | Barrett | July 4, 1939 |
| 2,241,658 | Engberg | May 13, 1941 |
| 2,250,411 | Baker | July 22, 1941 |
| 2,361,528 | Beloud | Oct. 31, 1944 |
| 2,400,776 | Nordeen et al. | May 21, 1946 |
| 2,485,002 | Krueger | Oct. 18, 1949 |
| 2,507,446 | Krueger | May 9, 1950 |
| 2,574,175 | Erhardt | Nov. 6, 1951 |
| 2,582,705 | Krueger | Jan. 15, 1952 |
| 2,597,602 | Sipior | May 20, 1952 |
| 2,710,063 | Krueger | June 7, 1955 |